(12) United States Patent
Banerjee et al.

(10) Patent No.: US 7,831,962 B2
(45) Date of Patent: Nov. 9, 2010

(54) TESTING SUBSYSTEMS ON PLATFORMS FOR SOFTWARE APPLICATIONS

(75) Inventors: Niloy Banerjee, Fremont, CA (US); Bret L. Foreman, San Francisco, CA (US); Theodore R. Haining, San Bruno, CA (US); Parikshit Bhaduri, Foster City, CA (US); Brom Mahbod, San Carlos, CA (US); Michael David Kavanaugh, San Francisco, CA (US); Dhaval Babulal Shah, Foster City, CA (US); William Fillmore Manry, IV, Monte Sereno, CA (US); Henry S. Willard, San Francisco, CA (US); John John E. So, Dublin, CA (US)

(73) Assignee: Oracle International Corporation, Redwood Shores, CA (US)

(*) Notice: Subject to any disclaimer, the term of this patent is extended or adjusted under 35 U.S.C. 154(b) by 1542 days.

(21) Appl. No.: 10/453,703

(22) Filed: Jun. 3, 2003

(65) Prior Publication Data
US 2004/0250243 A1    Dec. 9, 2004

(51) Int. Cl.
*G06F 9/44* (2006.01)
(52) U.S. Cl. .................................... 717/126
(58) Field of Classification Search ......... 717/124–135; 719/330
See application file for complete search history.

(56) References Cited

U.S. PATENT DOCUMENTS 7,155,428 B1 * 12/2006 Brown et al. .............. 707/4

OTHER PUBLICATIONS

Narita et al, "DOPG's Cross-Vendor Interoperability Tests of CORBA/OTS and EJB", The Distributed Object Promotion Group, pp. 1-13, 2001.*

Buhler et al, "Applying Ada, Java, and CORBA for Making a Command an Control Information System Platform Independent", ACM, pp. 83-88, 1999.*

Eric Allen, Diagnosing Java Code: Platform-dependence "gotchas", http://www-128.ibm.com/developerworks/java/library/j-diag0521.html, pp. 1-5, May 2002.*

Rivera et al, "HP-RMI: High Performance Java RMI over FM", 1997, University of Illinois at Urbana-Champaign, pp. 1-21.*

Buhler et al, "Making a C2 Information System Platform Independent by Using Internet and Middleware Technologies", 1999, Proceedings of the Command & Control Research & Technology Symposium 1999, Naval War College, Rhode Island, USA, vol. 2, pp. 1098-1108.*

Compaq, "Tru64 UNIX—Writing Device Drivers", Dec. 2000, Compaq Computer Corp., Texas, 279 pages.*

* cited by examiner

*Primary Examiner*—Ted T Vo
(74) *Attorney, Agent, or Firm*—Aka Chan LLP

(57) ABSTRACT

Techniques for testing subsystems on a platform for a software application are provided. A test application receives instructions for calling platform dependent subsystems directly. The instructions can be designed to fully test the capabilities of the subsystems. Once the instructions are executed, the results of the subsystems can be analyzed for platform certification, performance, reliability, and/or characteristics.

45 Claims, 7 Drawing Sheets

TESTING SUBSYSTEMS ON PLATFORMS FOR SOFTWARE APPLICATIONS

BACKGROUND OF THE INVENTION

The present invention relates to testing of software applications. More specifically, the invention relates to testing subsystems of a platform for software applications.

Software applications are commonly designed to be executed on many different platforms. Each platform can have different operating systems, device drivers, file systems, cluster software and interconnects, storage hardware, software and host bus adaptors (HBAs), and the like. It is an extremely challenging task to test subsystems (or changes thereof) of a platform for a software application.

In order to illustrate why this task is so challenging, FIG. 1 shows a diagram of examples of the capability and tested areas for a platform. Capability space 1 represents all the capabilities of a platform. The capability space is quite large and is not generally tested by platform vendors. However, it is common for platform vendors to test certain areas, which are shown as platform vendor tested areas 3.

Application utility space 5 represents the capabilities of platform 1 that are utilized by a software application. As shown, application utility space 5 overlaps some platform vendor tested areas but is, for the most part, not tested by the platform vendors.

An instance area 7 represents the capabilities that are utilized by the application at a specific moment in time. As shown, this area is smaller than application utility space 5. As the application executes, instant utilization space 7 can shrink, grow and move around within application utilization space 5.

Currently, some software applications are tested to cover a test area 9. As shown, the test area covers what may be utilized by an application at one instance in time. However, test coverage 9 can be substantially less than application utility space 5. Therefore, a running application will often exceed the bounds of test area 9 utilizing untested capabilities so there is a risk of failure and error.

Testing tools exist (e.g., IOZONE) that allow users to do performance testing of subsystems (e.g., file systems). These tools typically produce comparative performance rates between various systems but do not provide debug information if something goes wrong. Moreover, these tools are not designed with an application in mind. Therefore, these tools are similar to the test performed by platform vendors in that they are generic and not designed for testing subsystems on a platform for a specific software application.

It would be beneficial to have innovative techniques for testing software applications subsystems on a platform for software applications. Additionally, it would be beneficial to test the full application utility space (and perhaps more).

SUMMARY OF THE INVENTION

The present invention provides innovative techniques for testing subsystems on a platform for software applications. In general, a test application calls platform (or hardware) dependent subsystems directly (e.g., not through a generic application interface). The testing application receives instructions to call the platform dependent systems, makes the calls, and analyzes the results. By calling the platform dependent subsystems directly, the subsystems can be tested more thoroughly than with conventional techniques and can be designed to test the actual application utility space. Additionally, testing, reproducing and identifying bugs or incompatibilities can be accomplished in a very short amount of time. Some specific embodiments of the invention are described below.

In one embodiment, the invention provides a method of testing subsystems of a platform for a software application. Instructions to call the platform dependent subsystems are received. Calls to the platform dependent subsystems are performed according to the instructions to test the subsystems. Results from the calls to the platform dependent subsystems are then analyzed. The platform dependent subsystems can be subsystems of the software application, operating subsystems, device driver subsystems, hardware subsystems, and the like.

In another embodiment, the invention provides a method of testing subsystems of a platform for a software application. A test application that is capable of performing calls directly to platform dependent subsystems. The test application receives instructions to call the platform dependent subsystems and performs calls to the subsystems according to the instructions to test the subsystems. Results from the calls to the platform dependent subsystems are then analyzed. In some embodiments, the instructions are stored in a file that may be readily changed for more accurate testing.

In another embodiment, the invention provides a method of testing the shared subsystems of a platform cluster. Such a cluster consists of a group of independent application platforms linked by a high performance interconnect that share a carefully defined set of subsystems. In this environment, the testing application receives instructions to call the shared subsystems and uses the high performance interconnect to perform calls on each application platform according to the instructions to test the shared subsystems. Results from the calls made by each independent application platform to the shared subsystems are then collected, collated, and analyzed using the high performance interconnect. As with some other embodiments, the instructions to perform these tests are stored in a file that may be readily changed for more accurate testing.

Other features and advantages of the invention will become readily available apparent upon review of the following description in association with the accompanying drawings, where the same or similar structures are designated with the same reference numerals.

DETAILED DESCRIPTION OF PREFERRED EMBODIMENTS

In the description that follows, the present invention will be described in reference to embodiments that test subsystems on a platform for a software application, such as a database application. However, embodiments of the invention are not limited to any particular architecture, environment, application, or implementation. For example, although embodiments will be described in reference to database applications, the invention may be advantageously applied to any software application. Therefore, the description of the embodiments that follows is for purposes of illustration and not limitation.

Figure 1:
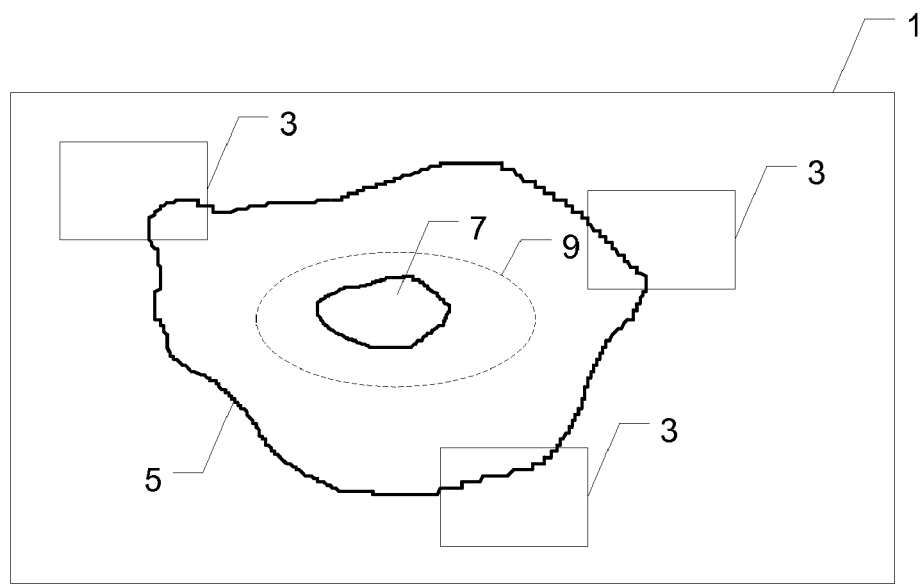
FIG. 1 shows an illustration of the capabilities and tested areas of a platform and software application.
Figure 2:
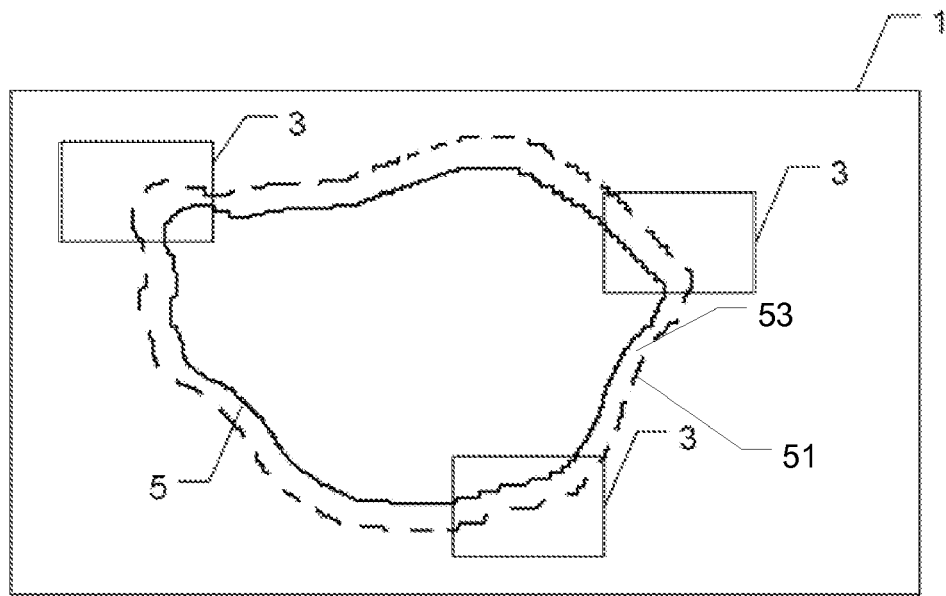
FIG. 2 shows an illustration is similar to FIG. 1 except that the tested area of the software application fully covers the application utility space (and more) for a fully tested software application.

FIG. 2 shows an illustration of the capabilities and tested areas of a software application utilizing an embodiment of the invention. Capability space 1, platform tested areas 3 and application utility space 5 are the same as in FIG. 1. With embodiments of the invention, instructions for testing subsystems, both platform dependent and independent, can be generated to test portions of application utility space 5.

By increasing the portions of application utility space 5 that are tested, a tested area 51 can be achieved where the full application utility space is tested. Additionally, the instructions can be designed to over stress the application for the platform such that a safety envelope 53 is achieved further insuring that the software application is fully tested for the platform.

Figure 3:
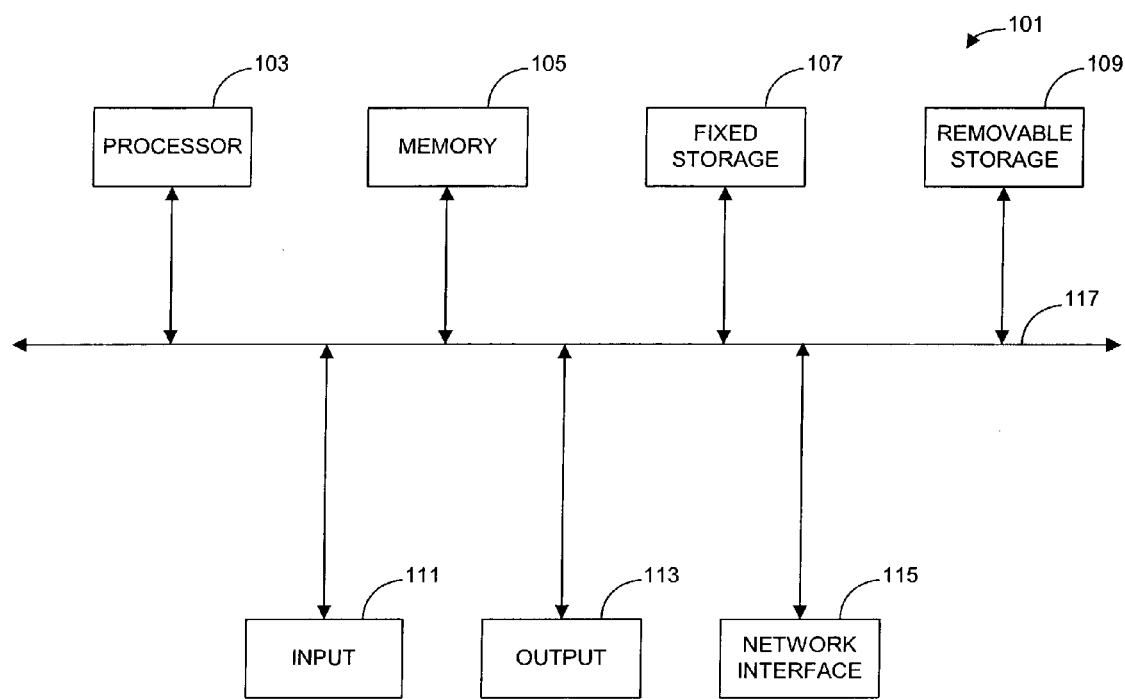
FIG. 3 illustrates a block diagram of a computer system that can be utilized in association with embodiments of the invention.

FIG. 3 shows a block diagram of components that can be present in computer systems that implement embodiments of the invention. A computer system 101 includes a processor 103 that executes instructions from computer programs (including operating systems). Although processors typically have memory caches also, processor 103 utilizes memory 105, which can store instructions or computer code and data.

A fixed storage 107 can store computer programs and data such that it is typically persistent and provides more storage when compared to memory 105. At present, a common fixed storage for databases is multiple (e.g., arrays) hard drives. A removable storage 109 provides mobility to computer programs and/or data that are stored thereon. Examples of removable storage are floppy disks, tape, CD/ROM, flash memory devices, and the like.

Memory 103, fixed storage 107 and removable storage 109 provide examples of computer readable storage media that can be utilized to store and retrieve computer programs incorporating computer codes that implement the invention, data for use with the invention, and the like. An input 111 allows a user to interface with the system. Input can be done through the use of a keyboard, a mouse, buttons, dials, or any other input mechanism. An output 113 allows the system to provide output to the user. Output can be provided through a monitor, display screen, LEDs, printer or any other output mechanism.

A network interface 115 allows the system to interface with a network to which it is connected. The system bus architecture of computer system 101 is represented by arrows 117. The components shown in FIG. 3 can be found in many computer systems. However, components can be added, deleted and combined. For example, fixed storage 107 could be a file server that is accessed through a network connection. Thus, FIG. 3 is for illustration purposes and not limitation.

FIG. 3 shows some of the hardware that can be present in computer systems that execute software applications. There are often multiple layers that operate above the hardware as illustrated by FIG. 4.

Figure 4:
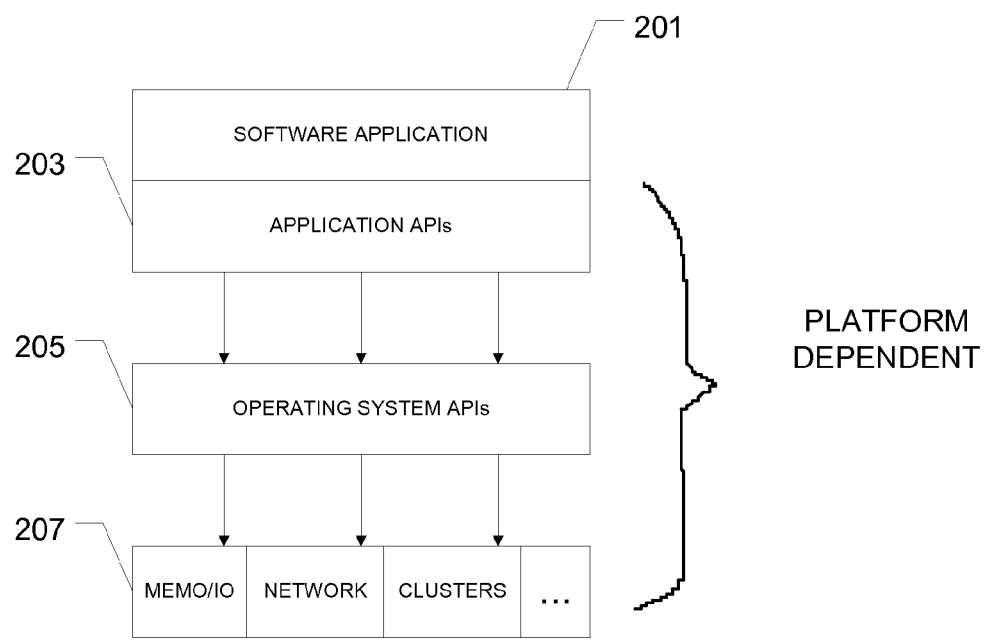
FIG. 4 shows an example of the multiple layers in the design of typical software applications.

A software application 201 is shown as the highest level in FIG. 4. Software application 201 represents a generic layer as the computer code is designed to operate on any platform. Layer 203 includes Application Programming Interfaces (APIs) of the software application that are specific to the operating system of the platform. Below that, a layer 205 represents system level software on the platform such as the operating system, device drivers, and the like. Hardware 207 represents hardware components of the system.

With a database application, it is common for users to enter structured query language (SQL) statements. Software application 201 interprets the SQL statements and performs the appropriate processing. Many statements result in calling APIs in layer 203, which in turn call APIs in layer 205, which in turn direct or access components in hardware 207.

As shown, layers 203, 205, and 207 are platform dependent. Although FIG. 4 shows exemplary layers, the invention can be advantageously applied to any number layers and any configuration of the layers.

Conventional database applications are tested in a manner similar to how a user operates the database (e.g., executing high level SQL statements). However, it takes one that is very knowledgeable in the software application and platform dependent layers in order to devise high level statements that fully test the platform dependent subsystems. In fact, it may be very difficult, if not impossible, to effectively stress test the subsystems utilizing high level commands.

Figure 5:
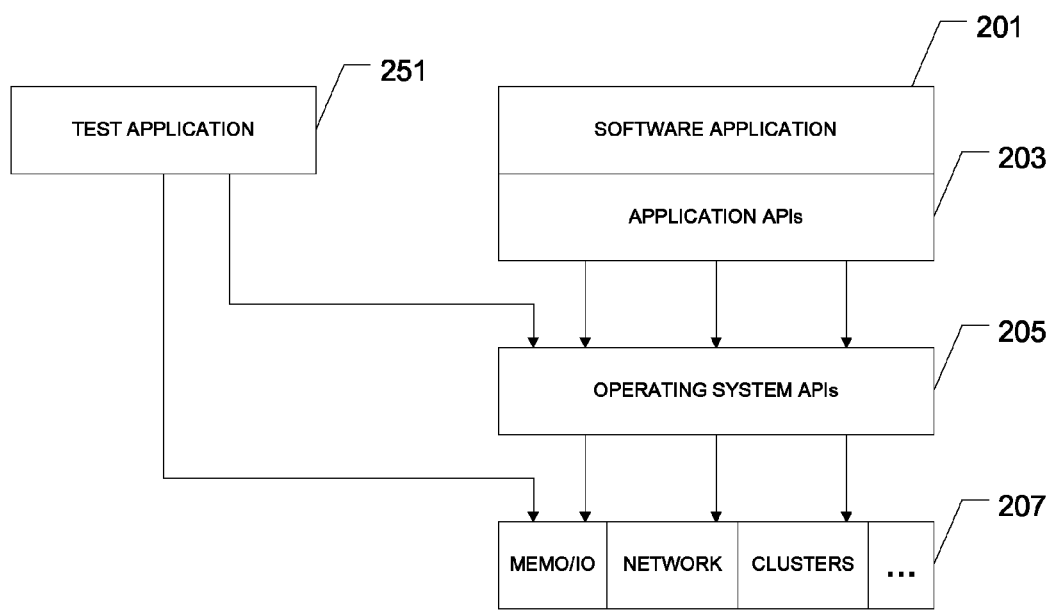
FIG. 5 shows an illustration of a test application that directly calls platform dependent subsystems in order to test them.

FIG. 5 shows an embodiment of the invention that includes a test application that directly calls platform dependent subsystems. Test application 251 can be conceptually thought of as being at the same generic layer as software application 201.

Test application 251 can be designed to simulate the performance and characteristics of software application 201. However, test application 251 can directly call platform dependent subsystems as shown. Thus, test application 251 can be directed by high level commands like software application 201, but can also receive instructions to call platform dependent subsystems directly.

By allowing the platform dependent subsystems to be called directly, it is much easier to fully test the subsystems. For example, with embodiments of the invention, bugs or errors can be identified in a matter of hours instead of days because the test application can be easily directed to stress test areas of interest.

In some embodiments, software application 201 is not required to test subsystems of a platform with test application 251. In other words, test application 251 can be utilized to test a platform regardless of whether a software application 201 has been installed. In other embodiments, the test application functionality can be included in software application 201.

Figure 6:
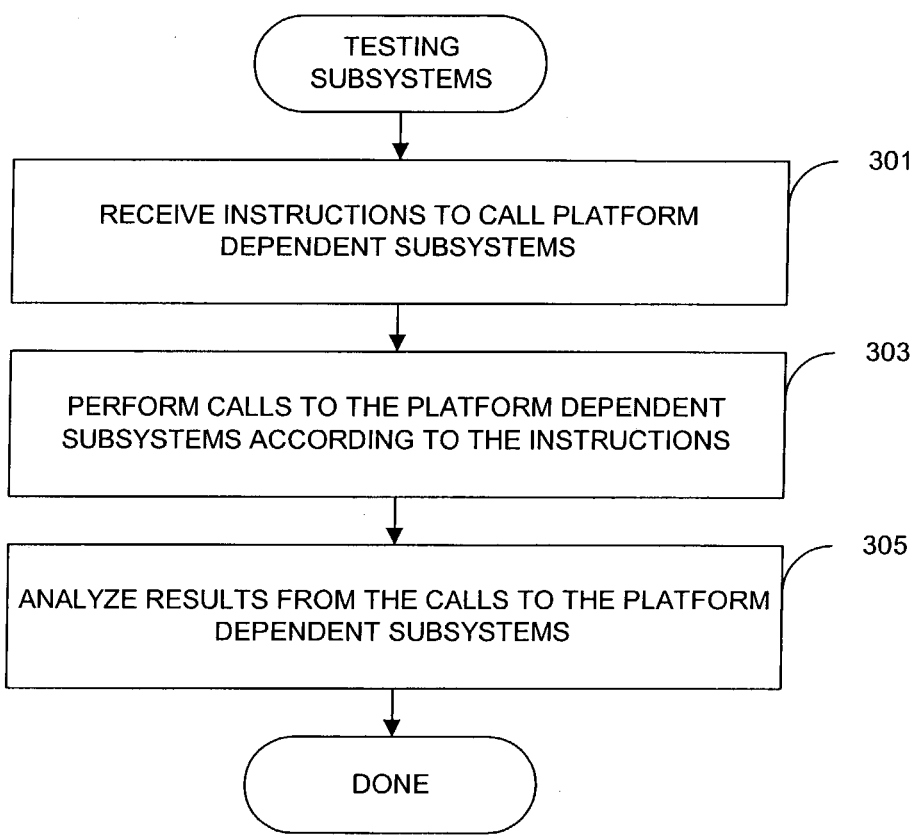
FIG. 6 shows a flowchart of a process of testing platform dependent subsystems of a software application.

FIG. 6 shows a flowchart of a process of testing subsystems on a platform. As with all flowchart shown herein, steps can be added, deleted, combined, and reordered without departing from the spirit and scope of the invention.

At a step 301, instructions to call platform dependent subsystems are received. The instructions can be stored in a file, such as a text file that is easily modified by test personnel. Details of one embodiment of the file (or jobfile) will be describe below.

Calls to the platform dependent subsystems are performed according to the instructions at a step 303. Additionally, calls can also be made to platform independent subsystems including high level software application commands.

At a step 305, results from the calls to the platform dependent subsystems are analyzed. The results of any test can be in many forms. For example, results can be pass/fail, performance, reliability, characteristics, and the like.

Figure 7:
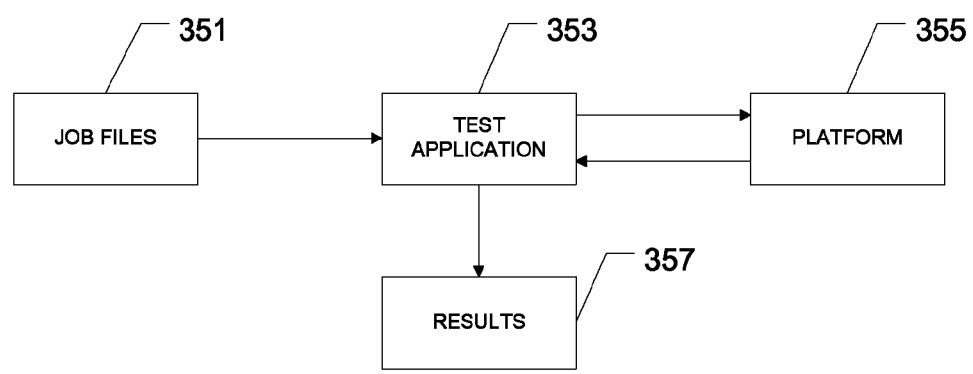
FIG. 7 shows a diagram of a test application that receives instructions in a jobfile, performs the instructions to test subsystems of the platform and analyzes results of the test.

In one embodiment, the instructions for the test application are stored in a jobfile as shown in FIG. 7. One or more jobfiles 351 store instructions to test subsystems on the platform for a software application. A test application 353 receives the one or more jobfiles and the instructions contained therein.

Test application 353 interprets each jobfile and creates any internal data structures that are required to perform the instructions better contained in the jobfile. The jobfile can be a text file where each of the instructions has parameters that are readily identifiable by test personnel so that the jobfiles can be changed with ease.

Test application 353 performs calls to platform dependent subsystems on platform 355. As the calls are being made and executed, test application 353 monitors platform 355 and creates results 357 indicating how the one or more subsystems performed. As mentioned previously, the results can be in many formats.

In one embodiment, test application 353 is able to do concurrent input/output (I/O) to multiple files or devices, as is common with database applications. A stream can be defined in a jobfile that translates to a process with its own address space at one time. A process can do read, write, or a mix of both one of a specified I/O discipline, into multiple devices of different types, in a specified pattern, for a certain period of time, and with a certain achievable rate.

A stream can be specified in the jobfile to run on the same node or a remote node in a cluster. Streams in a cluster environment can be coordinated to work coherently during the test. Streams can also be coupled together if needed to capture I/O or other subsystem dependencies between them. For example, a stream emulating the database writer process can be coupled with a stream emulating the log writer process. The streams can also be used to emulate the various database processes doing I/O in a system.

Parameters relating to I/O can be easily manipulated in the jobfile and the effects of doing do can be readily seen. This enables a user to effectively test the functional corners of an I/O platform very quickly.

Within the jobfile, each stream can have a target I/O rate specified. The test application measures the I/O rate at a frequent interval to try to ensure that the actual rate of doing the I/O to/from the stream is as close the I/O rate as possible. Accordingly, it is possible to maintain a steady rate of doing I/O through the duration of the stream.

The test application can provide accurate timing measurements to monitor various activities like I/O rates, write-ordering, and the like. The steady I/O rates and the ordering of various I/O activities can typically only be done through a precise timer or mechanism. Depending on the availability on a particular platform, the test application uses the real time system clock and measures time in the order of nanoseconds.

Each stream can have two memory sections shared and private. The shared memory region can be used to keep the I/O buffers shared among a group of processes and the private area can be for data structures local to a process. The size of the shared memory region may be a configurable parameter in the jobfile.

The results of executing instructions from a jobfile can be obtained in several different forms depending on the purpose of use. The pass/fail output for certification of platforms, the overall and interval I/O for performance and reliability tests, and the graphical output for I/O characteristics.

The test application can provide data validation where the I/O to the devices can be validated on the next reading of the block in this mode. A preset pattern is written on the I/O device along with the checksum. While doing regular I/O, the checksum is verified against the one from the recently read block to validate the I/O to the block.

Additionally, the test application can provide non-interfering event logging. Logging of I/O events occur to memory mapped files. A central logging server accepts logging requests from all the processes in the system with a specified level and determines the appropriate time to dump the most recent contents to a file on a different file system. This can ensure that there is minimum interference between the I/O patterns of the streams and the I/O due to tracing. In some embodiments, users have the ability of specifying various logging levels as desired.

Figure 8:
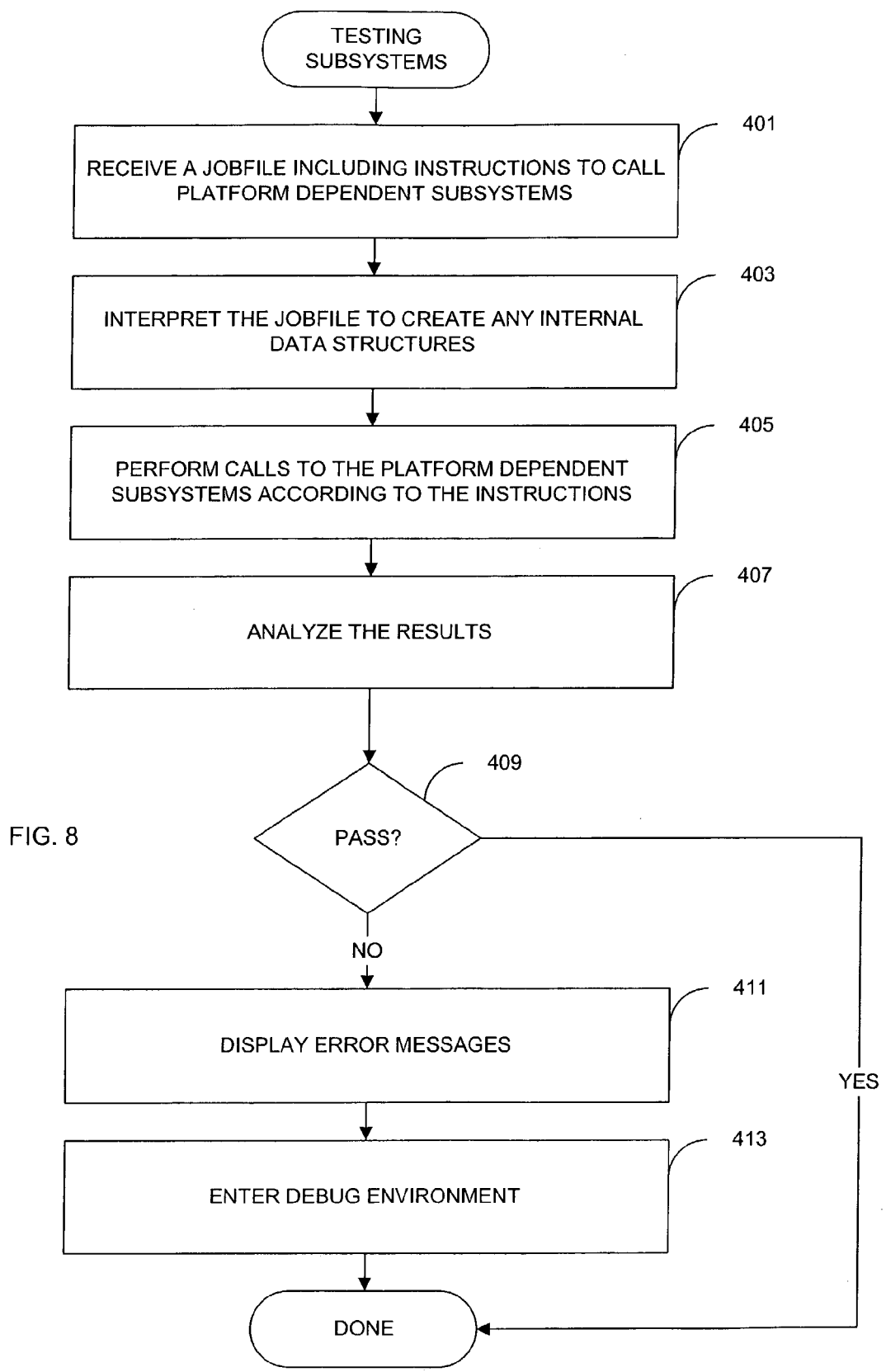
FIG. 8 shows a flowchart of another process of testing platform dependent subsystems for a software application.

Now that details of the jobfile and functional specifications of the test application have been described, FIG. 8 shows another process of the testing subsystems of a platform for a software application.

At a step 401, a jobfile including instructions to call platform dependent subsystems is received. The jobfile can also call platform independent subsystems and can include many different parameters to define the one or more tests in the jobfile.

The jobfile is interpreted at a step 403 to create any internal data structures. At this step, the test application prepares data structures for executing tests defined by the instructions in the jobfiles.

As at step 405, calls to the platform dependent subsystems are performed according to the instructions. The results of the instructions on the platform are noted and at a step 407, the results are analyzed. If the platform passes at a step 409, the user may be notified accordingly. Otherwise, error messages may be displayed at a step 411. Additionally, the test application could automatically enter a debug environment at a step 413 in order to attempt to isolate the problem.

FIG. 8 shows an example where the test results in a simple pass/fail such as for certification of platforms. Other tests could result in performance and reliability results or graphical output for I/O characteristics.

An embodiment of this invention for testing database clusters is very similar in architecture and operation. A database cluster consists of two or more computer systems, each of which can be described by the block diagram in FIG. 3. These computer systems employ dedicated hardware, such as a set dedicated network interfaces 115, to implement a set of cluster services. These services provide APIs as in layer 205 of FIG. 4 that communicate with cluster-dedicated hardware in layer 207.

Access to these cluster services is provided by both operating system specific and application generic software layers, 203 and 201 in FIG. 4 respectively. Test application 251 in FIG. 5 would communicate with these cluster services in a manner designed to simulate software application 201. The subsystem testing processes shown in FIGS. 6 and 7 could be conceptually the same but slightly different in embodiments that test database clusters.

Differences could include, but are not limited to, extensions to the format of jobfile 351 to describe clusters and their operation, the ability of test application 353 to start and control processes on each computer system within the cluster, display special results and error messages that describe the performance of cluster services, and the like.

While the above is a complete description of preferred embodiments of the invention, various alternatives, modifications, and equivalents can be used. It should be evident that the invention is equally applicable by making appropriate modifications to the embodiments described above. For example, although the format and characteristics of jobfiles for some embodiments are described, embodiments of the invention are not limited to these specific features of the embodiment described herein. Therefore, the above description should not be taken as limiting the scope of the invention that is defined by the metes and bounds of the appended claims along with their full scope of equivalents.

What is claimed is:

1. A method of testing platform dependent subsystems of a platform for a software application, comprising:
   receiving a first set of instructions to call a first platform dependent subsystem to test;
   receiving a second set of instructions to call a first platform dependent subsystem to test, wherein the first platform dependent subsystem comprises a different platform from the second platform dependent subsystem;
   using a computer processor, based on the first set of instructions received, generating first commands for testing the first platform dependent subsystem as indicated by the first set of instructions, wherein the first commands are compatible with the first platform dependent subsystem and not compatible with the second platform dependent system;
   using the computer processor, generating a first internal data structure associated with the first commands, wherein the first internal data structure is used when performing testing of the first platform dependent subsystem;
   transmitting the first commands to the first platform dependent subsystem;
   using the computer processor, based on the second set of instructions received, generating second commands for testing the second platform dependent subsystem as indicated by the second set of instructions, wherein the second commands are compatible with the second platform dependent subsystem and not compatible with the first platform dependent system;
   using the computer processor, generating a second internal data structure associated with the second commands, wherein the second internal data structure is used when performing testing of the second platform dependent subsystem;
   transmitting the second commands to the second platform dependent subsystem;
   permitting testing of the first platform dependent subsystem by the first commands during testing of the second platform dependent subsystem by the second commands;
   receiving first test results from testing of the first platform dependent subsystem using the first commands;
   receiving second test results from testing of the second platform dependent subsystem using the second commands; and
   analyzing the first and second test results from testing of the first and second platform dependent subsystems.

2. The method of claim 1, further comprising
   performing concurrent input/output (I/O) to multiple files associated with the first platform dependent subsystem.

3. The method of claim 2, wherein the first set of instructions comprises specifying of a first stream that translates to a process with its own address space at one time, the process capable of performing a read, write, or both, of multiple devices.

4. The method of claim 3, wherein the first stream comprises an ordering of write activities and the analyzing results from the first commands to the first platform dependent subsystem comprises measuring a total time of the ordering of write activities of the first stream.

5. The method of claim 4, wherein the first set of instructions comprises a second stream that concurrently outputs data while accepting the output of the first stream.

6. The method of claim 5, wherein the first set of instructions further comprises a parameter to set an input/output (I/O) rate of the first stream.

7. The method of claim 3, wherein an output of the first stream comprises writing a pattern and a first checksum associated with the pattern, and the analyzing the first and second test results from testing of the first and second the platform dependent subsystems comprises verifying a second checksum calculated for an output block of the second process against the first checksum.

8. The method of claim 5, further comprising capturing dependencies between the first and second streams, wherein the analyzing the first and second test results from testing of the first and second platform dependent subsystems comprises evaluating the captured dependencies.

9. The method of claim 3 wherein the first stream emulates a database writer process.

10. The method of claim 9, wherein the first set of instructions comprises specifying a second stream that emulates a log write process.

11. The method of claim 10 wherein the first stream is coupled to the second stream to capture I/O dependencies between the first and second streams.

12. The method of claim 1, wherein the first commands comprise performing a first call to the platform dependent subsystem, the first call comprising a first stream having a first address space, a second stream having a second address space, and an output of the first stream is used as input to the second stream, wherein each stream has a shared memory section and a private memory section, and a shared memory section of the first address space is accessible to both the first and second streams while a private memory section of the first address space is not accessible by the second stream.

13. The method of claim 12, wherein a size of the shared memory section of the first address space for the first stream is configurable via a parameter of the instructions.

14. The method of claim 1, wherein the software application is a database program.

15. The method of claim 1 wherein the first set of instructions to call the first platform dependent subsystem comprises a first test to be performed on the first platform dependent subsystem.

16. The method of claim 1 comprising:
   based on the first set of instructions received, generating third commands executable on the first platform dependent subsystem.

17. The method of claim 16 comprising:
   sending the third commands to the first platform dependent subsystem.

18. The method of claim 1 wherein the first commands to the first platform dependent subsystem are native to the first platform dependent subsystem.

19. The method of claim 1 further comprising:
   performing first calls to the first platform dependent subsystems according to the first set of instructions, wherein the first calls are performed to the first platform dependent subsystem without a middle layer.

20. The method of claim 1 wherein calls are performed with native commands to the platform dependent subsystems according to the instructions to test the subsystems.

21. The method of claim 1 wherein the first calls are different from the instructions.

22. The method of claim 1 wherein the calls do not include the instructions.

23. The method of claim 1 wherein the first set of instructions comprises specifying of a first stream and a second stream, the first stream capable of translating to a process with its own address space at one time, the second stream capable of translating to a process with its own address space at one time, wherein the first and second streams are coordinated to work coherently during the test to capture dependencies between the first and second streams.

24. The method of claim 23 wherein the first stream is a database writer process and the second stream is a log writer process.

25. A computer program product embodied in a computer readable storage medium that tests platform dependent subsystems of a platform for a software application, comprising:
computer code that receives first instructions to call a first platform dependent subsystem;
computer code that receives second instructions to call a second platform dependent subsystem, which is different from the first platform dependent subsystem;
computer code that performs first calls to the first platform dependent subsystem according to the first instructions to test the first platform dependent subsystem, wherein the first calls are in a format directly executable by the first platform dependent subsystem and not directly executable by the second platform dependent subsystem;
computer code that generates a first data structure associated with the first calls, wherein the first data structure is used when performing a test of the first platform dependent subsystem;
computer code that transmits the first call to the first platform dependent subsystem;
computer code that performs second calls to the second platform dependent subsystem according to the second instructions to test the second platform dependent subsystem, wherein the second calls are in a format directly executable by the second platform dependent subsystem and not directly executable by the first platform dependent subsystem;
computer code that transmits the second calls to the second platform dependent subsystem;
computer code that permits testing of the first platform dependent subsystem by the first calls during testing of the second platform dependent subsystem by the second calls;
computer code that receives first test results from testing of the first platform dependent subsystem using the first calls;
computer code that receives second test results from testing of the second platform dependent subsystem using the second calls; and
computer code that analyzes results from the first and second calls to the first and second platform dependent subsystems.

26. The computer program product of claim 25, wherein the computer readable storage medium is at least one of a CD-ROM, floppy disk, tape, flash memory, system memory, or hard drive.

27. The computer program product of claim 25 wherein the first set of instructions comprises computer code that specifies a first stream that translates into a process with its own address space at one time, the process capable of performing a read, write, or both, of multiple devices.

28. A method of testing platform dependent subsystems of a platform for a software application, comprising:
providing a test application capable of performing calls directly to the platform dependent subsystems;
the test application receiving instructions to call a first platform dependent subsystem and a second platform dependent subsystem, different from a platform of the second platform dependent subsystem;
the test application generating at least a first call to test the first platform dependent subsystem based on the instructions, where the at least a first call is compatible with the first platform dependent subsystem and not compatible with the second platform dependent system;
the test application generating a first data structure associated with the at least a first call, wherein the first internal data structure is used when testing the first platform dependent subsystem;
the test application performing at least a first call directly to the first platform dependent subsystem according to the instructions to test the first platform dependent subsystem;
the test application generating at least a second call to test the second platform dependent subsystem based on the instructions, wherein the at least a second call is compatible with the second platform dependent subsystem and not compatible with the first platform dependent system;
the test application generating a second data structure associated with the second commands, wherein the second data structure is used when testing the second platform dependent subsystem;
the test application performing at least a second call directly to the second platform dependent subsystem according to the instructions to test the second platform dependent subsystem;
permitting testing of the first platform dependent subsystem by the at least a first call during testing of the second platform dependent subsystem by the at least a second call;
receiving a first test output from a test of the first platform dependent subsystem using the at least a first call;
receiving a second test output from a test of the second platform dependent subsystem using the at least a second call; and
analyzing results from the first and second calls to the first and second platform dependent subsystems.

29. The method of claim 28, where the test application emulates the software application.

30. The method of claim 28, wherein the platform dependent subsystems are subsystems of the software application, operating system subsystems, device driver subsystems, or hardware subsystems.

31. The method of claim 28, wherein the instructions are stored in a file.

32. The method of claim 31, wherein the file includes parameters for the instructions.

33. The method of claim 31, wherein the file specifies streams that execute as processes.

34. The method of claim 33, wherein the file specifies a target input/output (I/O) rate for the streams.

35. The method of claim 33, wherein the test application measures an I/O rate for the streams at an interval.

36. The method of claim 28 wherein the first calls can comprise a first stream and a second stream, and an output of the first stream can be used as input to the second stream.

37. The method of claim 36 wherein the first stream is a database writer process and the second stream is a log writer process.

38. A computer program product embodied in a computer-readable medium that tests platform dependent subsystems of a platform for a software application, comprising:

computer code that emulates the software application as a test application capable of performing calls directly to the platform dependent subsystems;

computer code that receives instructions to call the platform dependent subsystems, wherein the instructions comprise a first set of parameters and a second set of parameters, the first set of parameters specifying a first test to perform on a first platform dependent subsystem and the second set of parameters specifying a second test to perform on a second platform dependent subsystem;

computer code that generates first calls for testing the first platform dependent subsystem based on the instructions, wherein the first calls are compatible with the first platform dependent subsystem and not compatible with the second platform dependent system;

computer code that generates a first data structure associated with the first commands, wherein the first data structure is used for performing testing of the first platform dependent subsystem;

computer code that performs first calls to the first platform dependent subsystem based on the instructions;

computer code that generates second calls for testing the second platform dependent subsystem based on the instructions, wherein the second calls are compatible with the second platform dependent subsystem and not compatible with the first platform dependent system;

computer code that generates a second data structure associated with the second commands, wherein the second data structure is used for performing testing of the second platform dependent subsystem;

computer code that performs second calls to the second platform dependent subsystem based on the instructions, wherein the first platform dependent subsystem comprises a different platform from the second platform dependent subsystem;

computer code that permits testing of the first platform dependent subsystem by the first calls and testing of the second platform dependent subsystem by the second calls;

computer code that receives a first test result from testing of the first platform dependent subsystem using the first calls;

computer code that receives a second test result from testing of the second platform dependent subsystem using the second calls; and computer code that analyzes results from the first and second calls to the first and second platform dependent subsystems.

39. The computer program product of claim 38, wherein the computer readable medium is at least one of a CD-ROM, floppy disk, tape, flash memory, system memory, or hard drive.

40. A system, comprising:

hardware;

hardware dependent software, executing on the hardware;

a test application that receives instructions to call the hardware dependent software, performs calls to the hardware dependent software and analyzes results of the calls to the hardware dependent software, wherein the test application is capable of monitoring activity comprising I/O rates and write-ordering, the test application generates a stream that has two memory sections, a shared area and a private area, where the shared memory region is used to keep I/O buffers shared among a group of processes and the private area is used for data structures local to a process, and a size of the shared memory region is a user-configurable parameter, and the test application is capable of performing data validation where I/O to devices can be validated on a next reading of a block in a data validation mode, a preset pattern is written on an I/O device along with a checksum, and while doing a subsequent I/O, the checksum is verified against the one from a read block to validate an I/O to the block; and a logging server, coupled to the test application and the hardware dependent software, wherein the logging server accepts logging requests from all the processes in the system with a specified level and determines an appropriate time to dump the most recent contents to a memory-mapped file on a disk-based file system.

41. The system of claim 40, wherein the test application uses a real time system clock and measures time in an order of nanoseconds.

42. The system of claim 40 wherein the test application that performs calls to the hardware dependent software comprises:

the test application that performs first calls to a first hardware dependent software; and the test application that performs second calls to a second hardware dependent software, wherein the second calls are different from the first calls.

43. The system of claim 42 wherein the first hardware dependent software comprises different APIs from the second hardware dependent software.

44. A method of testing subsystems of a platform dependent subsystem for a software application comprising:

receiving instructions comprising first information indicating a first selected platform subsystem to test and second information indicating a test to be performed on the first selected platform subsystem;

receiving instructions comprising third information indicating a second selected platform subsystem to test and fourth information indicating a test to be performed on the second selected platform subs stem wherein the first selected platform subs stem comprises a different platform from the second selected platform subsystem;

based on the received instructions, generating first commands for the first selected platform subsystem to perform the indicated test on the first selected platform subsystem, wherein the first commands are compatible with the first selected platform subsystem and not compatible with the second selected platform subsystem;

generating a first data structure associated with the first commands to be used when performing testing of the first selected platform subsystem;

sending the first commands to the first selected platform subsystem, wherein the first selected platform subsystem will execute the commands;

based on the received instructions, generating second commands for the second selected platform subsystem to perform the indicated test on the second selected platform subsystem;

sending the second commands to the second selected platform subsystem to be executed by the second selected platform subsystem;
permitting testing of the first selected platform subsystem by the first commands and permitting testing of the second selected platform subsystem by the second commands; and analyzing test results from the commands sent to the first and second selected platform subsystems.

45. The method of claim 44 wherein the instructions are stored in a file.

* * * * *

UNITED STATES PATENT AND TRADEMARK OFFICE
CERTIFICATE OF CORRECTION

PATENT NO.       : 7,831,962 B2
APPLICATION NO.  : 10/453703
DATED            : November 9, 2010
INVENTOR(S)      : Niloy Banerjee et al.

Page 1 of 1

It is certified that error appears in the above-identified patent and that said Letters Patent is hereby corrected as shown below:

In column 12, line 48, in claim 44, delete "subs stern" and insert -- subsystem, --, therefor.

Signed and Sealed this
Second Day of August, 2011

David J. Kappos
*Director of the United States Patent and Trademark Office*